United States Patent Office 2,768,705
Patented Oct. 30, 1956

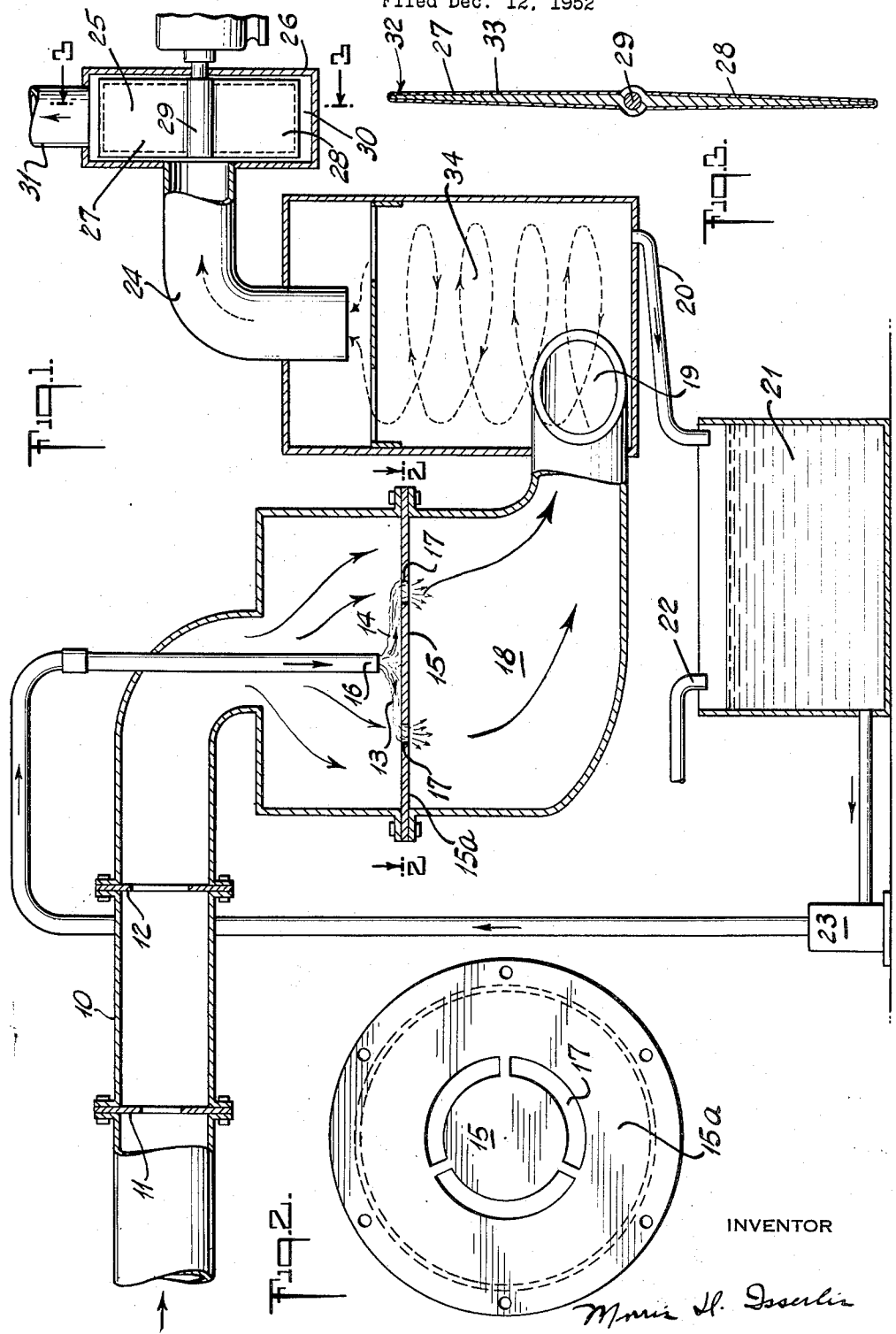

2,768,705

CLEANER FOR EXHAUST WASTE

Morris D. Isserlis, New Brunswick, N. J.

Application December 12, 1952, Serial No. 325,668

3 Claims. (Cl. 183—26)

This invention pertains to a cleaner for exhaust waste, to a process for cleaning waste, and particularly for cleaning smog-like waste contaminated with a substantial amount of liquid or solid material dispersed within and carried by a gaseous stream. The invention is concerned particularly with methods and devices for cleaning effluents prior to their discharge.

Cleaning methods and devices of the prior art show generally low cleaning efficiency and lack thoroughness of treatment, leaving substantial amounts of liquid and solid contaminants intermingled with the gas to escape with such exhaust gases into the surrounding atmosphere. In general such earlier devices lack a satisfactory propelling device for driving the waste through the cleaning chambers and are composed of individual chambers lacking great cleaning efficiency individually and collectively. The inefficiency of such prior art devices makes them useless where serious contamination problems require efficient precipitation and separation of liquids and solids from the cleaner gaseous part of the effluent.

Accordingly it is an object of the invention to provide waste cleaning apparatus and a corresponding process providing high efficiency of removal of solid or liquid contaminants. It is a further object to provide such a device requiring but little space. Yet a further object is to provide a waste cleaner operating economically, safely and without the use of complex or easily damaged parts. Still a further object of the invention is the provision of an efficiently operating high speed mechanism of very substantial force for propelling waste materials through the cleaning device and process.

Yet further objects of the invention will be understood from the following description particularly when it is read in conjunction with the appended drawing wherein:

Fig. 1 is a sectional assembled view of the cleaner.

Fig. 2 is a sectional view taken at right angles to the plane of Fig. 1 through line 2—2 and illustrating particularly the spider baffle of the invention.

Fig. 3 is a sectional view taken at right angles to the plane of Fig. 1 through line 3—3 and illustrating particularly the blade of the fan of the invention.

In accordance with one aspect of the invention, the waste passes, preferably from a precooler (not shown), through a tube 10 having at least one and preferably several baffles provided with restricted narrow orifices 11 and 12. The baffles are spaced from each other and reduce intermittently the passage for the contaminated gas to a fraction of the normal width of the flue tube. If several orifices are used, the individual orifices may vary in diameter from each other. Each baffle is mounted removably as shown for instance at mounting 35. Accordingly the baffles and their orifices may be removed for cleaning and the orifice size varied to vary capacity, efficiency and speed of the treatment. Before and after each orifice, eddy currents are caused in the passing waste as it goes through the flue tube. These currents cause agglomeration of impurities and aid materially in cleaning the main current of waste without slowing its passage substantially.

In preferred forms of the invention the main current passes from the flue into an enlarged chamber where within shearing area 13 it shears liquid 14, preferably a slow moving current of water or treating agent. The currents of waste and liquid impinge upon the center plate 15 of a spider baffle 15a placed only a short distance from the effluent end of liquid lead pipe 16. The liquid is spread over a relatively wide area of the spider baffle and the passages for the waste current through the baffle are relatively narrow as illustrated passages 17. Intimate forceful contact of water and waste in the area, particularly when the liquid is slow moving and the gas fast moving, results in violent shearing of the liquid stream by the gas. This in turn atomizes the liquid and accelerates materially precipitation of impurities from the current of gaseous waste. A typical arrangement of the spider and liquid pipe may involve an annular spider of half inch width around a circular twelve inch diameter plate and a linear distance of pipe end to baffle of about one inch.

A relatively wide contact area 18 for the activated waste may follow the baffle. After passing through contact area 18 the waste enters through a narrow opening 19 into a cyclone 19 having a drain for impurity carrying liquid such as drain 20.

The drain may lead the liquid into a settling tank 21 including liquid makeup mechanism 22 and a pump 23 for recirculation of the liquid into pipe 16. A flue 24 leads from the cyclone 19 toward a fan 25.

Obviously a fan of great efficiency and strength is desirable to provide effective flow of the waste current through an efficient cleaning mechanism of the type described above. A very strong exhaust system aids materially in providing the efficient shearing action described earlier in this specification. The fan of the invention provides such an efficient exhaust system and will be described in greater detail below.

In accordance with the invention the fan comprises a housing 26 showing relatively narrow tolerances for the fan blades 27 and 28 at right angles to the shaft 29 but relatively wide tolerances 30 parallel to the shaft. A flue 31 leads from the sides of the housing to a stack.

The blade of one important embodiment of the invention rotates at very substantial speeds and needs therefore a construction of substantial strength, permanence and coherence permitting efficient impelling of the currents. Blades 28 and 29 are accordingly securely attached to the shaft, preferably by welding, and in any case counterbalance each other. They taper slightly toward relatively narrow blade tips 32. This construction provides strength where strength is particularly needed, namely near the shaft but relatively light weight where lightness is especially needed, near blade tips 32, even if the fan blades are composed of relatively heavy materials. Use of but two blades as illustrated results in extremely good efficiency at high speeds. Much of the function of any intermediate blades is taken up by the currents between the two blades.

In addition, where necessary the currents between the blades may be utilized for further precipitation of remnants of impurities and such impurities removed on precipitation by drains from the fan or from the succeeding stack. A conventional filter may follow or precede the fan in the flow of the waste.

Parts of the apparatus of the invention may be covered, e. g. with rubber, to prevent undue corrosion. This is important particularly in connection with the fan blades whereon a typical corrosion-resistant coating is shown at 33 in the drawing. Silicone rubber, polychloroprenes, rubbers of the sulfide type, etc. may be used. The two-blade construction of the fan is particularly useful and efficient with corrosive waste because its simplicity and saving of materials requires but little coating and permits the use of highest quality corrosion-resistant bases and coatings.

The invention provides an efficient and economical system for cleaning fluid waste and an exhaust system of great efficiency and durability. Many other advantages and variations are apparent from the above description.

The claims are:

1. A cleaner for cleaning gaseous waste contaminated with a substantial amount of liquid or solid impurities comprising a gaseous waste conducting tube, means within said tube for creating eddy currents in gaseous waste passing through said tube to precipitate impurities therefrom, means defining an enlarged chamber connected to the outlet end of said tube, a spider baffle mounted within said chamber in the path of gaseous waste entering said chamber from said tube, means for flowing liquid upon said baffle at a rate which is slower than the rate at which gaseous waste is conducted to said baffle whereby said liquid is sheared by said gaseous waste and atomized during the passage of said liquid through said baffle thereby further removing impurities from said gaseous waste, a cyclone, means for conducting gaseous waste and atomized liquid from said chamber to the cyclone wherein residual impurities and said liquid are separated from said gaseous waste, a gase outlet flue leading from said cyclone, and a high speed fan located in the outlet flue of said cyclone for inducing high speed flow of gaseous waste through said tube, chamber and cyclone.

2. A cleaner for cleaning gaseous waste as recited in claim 1 wherein liquid separated from said gaseous waste within said cyclone is conducted to a settling tank, and means for recirculating liquid from said settling tank to said means for flowing liquid upon said baffle.

3. A cleaner for cleaning gaseous waste contaminated with a substantial amount of liquid or solid impurities comprising a gaseous waste conducting tube, a series of baffles located within said tube, said baffles having restricted orifices therein for creating eddy currents in gaseous waste passing through said tube to precipitate impurities therefrom, means defining an enlarged chamber connected at its upper portion to the outlet end of said tube, a spider baffle mounted within said chamber below said outlet end in the path of gaseous waste entering said chamber from said tube, said spider baffle having a plurality of restricted openings therein, means for flowing liquid upon said baffle at a rate which is slower than the rate at which gaseous waste is conducted to said baffle whereby said liquid is sheared by said gaseous waste and atomized during the passage of said liquid through said restricted openings thereby further removing impurities from said gaseous waste, a cyclone, means for conducting gaseous waste and atomized liquid from the lower portion of said chamber to the lower portion of said cyclone, a drain for conducting residual impurities and liquid separated from said gaseous waste within said cyclone to a settling tank, means for recirculating liquid from said settling tank to said means for flowing liquid upon said baffle, a gas outlet flue leading from said cyclone, and a high speed fan located in the outlet flue of said cyclone for inducing high speed flow of gaseous waste through said tube, chamber and cyclone.

References Cited in the file of this patent

UNITED STATES PATENTS

| | | |
|---|---|---|
| 550,796 | Marshall | Dec. 3, 1895 |
| 1,310,633 | Roberts | July 22, 1919 |
| 1,637,597 | Ulrici | Aug. 2, 1927 |
| 1,767,089 | Miller et al. | June 24, 1930 |
| 1,979,189 | Bowers | Oct. 30, 1934 |
| 1,999,589 | Frey | Apr. 30, 1935 |
| 2,405,048 | Nickerson | July 30, 1946 |
| 2,462,518 | MacCracken | Feb. 22, 1949 |
| 2,496,281 | Fisher | Feb. 7, 1950 |
| 2,604,185 | Johnstone et al. | July 22, 1952 |